J. F. BARTOSIK.
POWER TRANSMITTING MECHANISM.
APPLICATION FILED MAY 25, 1910.

984,526.

Patented Feb. 21, 1911.

2 SHEETS—SHEET 1.

Witnesses
Chas. S. Lipley.
Henry Sens.

Inventor.
Joseph F. Bartosik
by C. M. Clarke
his Attorney

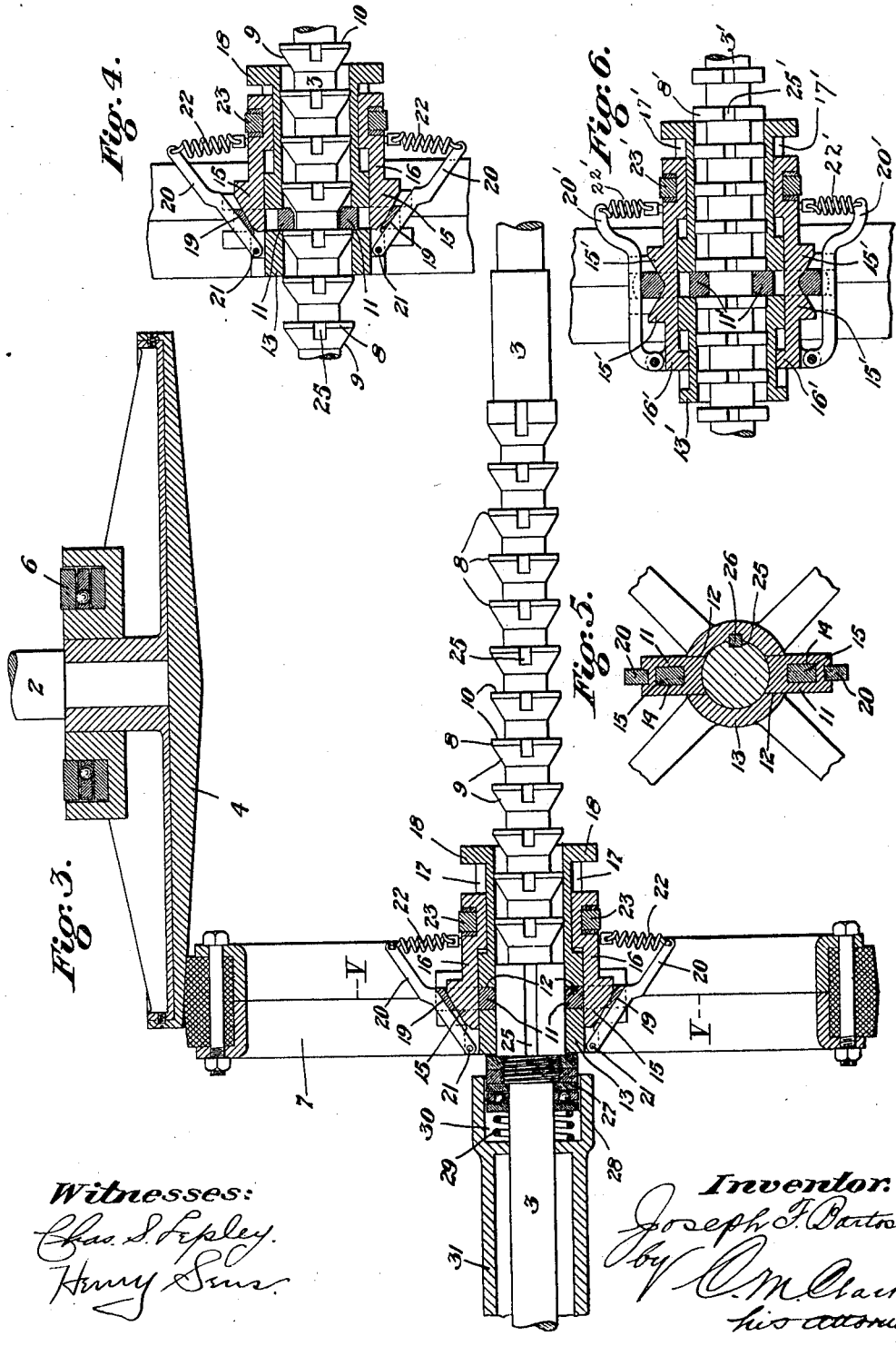

UNITED STATES PATENT OFFICE.

JOSEPH F. BARTOSIK, OF PITTSBURG, PENNSYLVANIA, ASSIGNOR OF ONE-FOURTH TO WILLIAM W. FORD AND ONE-FOURTH TO CLIFTON H. CLOSE, OF PITTSBURG, PENNSYLVANIA.

POWER-TRANSMITTING MECHANISM.

984,526. Specification of Letters Patent. Patented Feb. 21, 1911.

Application filed May 25, 1910. Serial No. 563,327.

*To all whom it may concern:*

Be it known that I, JOSEPH F. BARTOSIK, a citizen of the United States, residing at Pittsburg, in the county of Allegheny and State of Pennsylvania, have invented certain new and useful Improvements in Power-Transmitting Mechanism, of which the following is a specification, reference being had therein to the accompanying drawing.

My invention relates to improvements in variable drive mechanism for transmission of power from a prime mover or any constantly running uniform-speed power element to a countershaft, by means of which the countershaft may be geared to said element for varying speeds through an intervening shifting gear device.

The invention consists of the combination with the driven shaft and a driving disk, of a friction disk and means for shifting and setting it to variable positions on the driven shaft, as shall be more fully hereinafter set forth.

Figure 1:
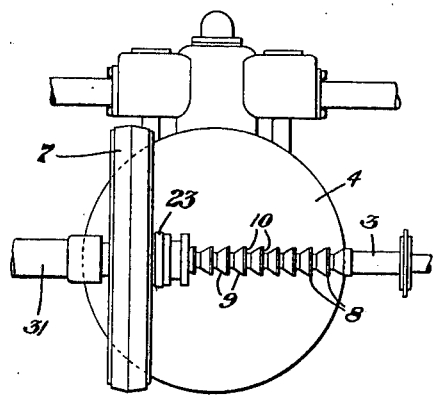
Figure 2:
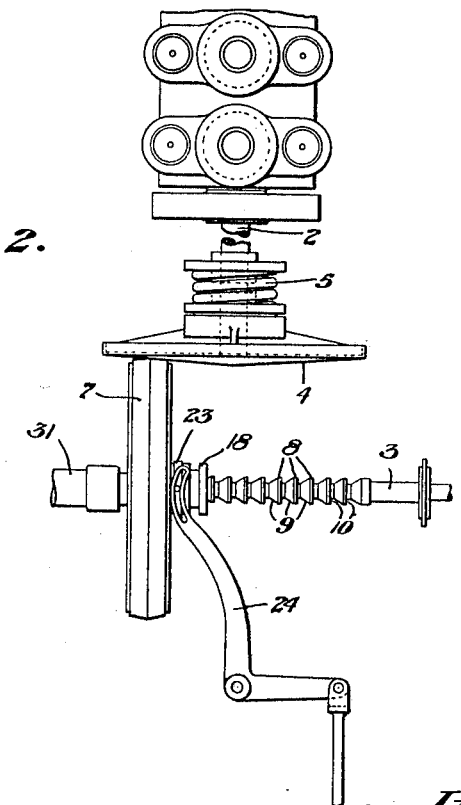

In the drawings:—Figures 1 and 2 illustrate in plan and elevation respectively, a power transmission equipment for automobiles embodying my invention. Fig. 3 is a horizontal sectional view, enlarged, showing the driving disk, friction disk and driven shaft, and the means for adjustment of the friction disk on said shaft. Fig. 4 is a detail view of said mechanism in a different position on the shaft. Fig. 5 is a cross section on the line V. V. of Fig. 3. Fig. 6 is a detail view similar to Fig. 4 showing a modified construction.

2 is the power shaft, either the main shaft of an engine or a shaft driven thereby from which it is desired to transmit rotary motion to shaft 3 at varying speeds, as for automobile driving.

4 is a driving friction disk secured on shaft 2 and provided with cushioning spring 5 and rolling thrust bearings 6, the face of the disk 4 being preferably slightly coned as shown.

7 is a power transmitting wheel adapted to be set at varying positions on shaft 3, said shaft having a series of radial collars 8 along so much of its length as it is desired to move the disk 7. One side of each of said collars 8 is beveled as at 9, the other side being shouldered as at 10, the purpose of which is to permit free movement of the interlocking mechanism in one direction without lifting the interlocking keys and to prevent movement in the other direction without first raising the keys. Said keys are indicated at 11 and are mounted for radial movement in suitable ways 12 in hub 13 of disk 7 and are apertured as at 14 to receive the lifting wedges 15. Said wedges extend from collar 16 which is slidingly mounted in ways 17 of collar 13 having a terminal limiting flange 18. The upper ends of keys 11 are inclined as at 19 providing bearing surfaces for depressing arms 20 pivoted at 21 and having retracting springs 22 attached to their other terminals and to the collar respectively, for the purpose of exerting normal inward pressure to insert keys 11 in the annular spaces between collars 8 and to engage the shoulders 9 and 10 thereof.

23 is a shifting collar engaging a suitable annular recess in collar 16 and operable by a lever 24 of any suitable construction, as shown in Fig. 2, whereby the collar 13 may be set at any position desired on shaft 3. Said shaft is also provided with a keyway 25 engaging key 26 of collar 13 thus insuring rotative engagement at all positions.

The end of shaft 13 is preferably provided with a thrust bearing 27 and rolling bearings 28 acting against a cushion spring 29 inserted in a suitable cavity 30 in an inclosing shell 31.

In operating the device, when it is desired to set disk 7 inwardly toward the center of disk 4 to reduce speed of shaft 3, lever 24 is operated in the proper direction to shift collar 13, whereupon wedges 15 will be first withdrawn and the end of collar 16 coming against flange 18 will shift collar 13 and the keys 11 will ride over inclined shoulders 9 and engage against shoulder 10 at the desired position. When lever 24 is operated in the reverse direction to shift disk 7 outwardly toward periphery of disk 4 to increase speed, wedges 15 will be first thrust inwardly, as in Fig. 3, lifting keys 11 from engagement until collar 13 is at the desired position, whereupon a slight reverse movement of lever 24 will withdraw wedges 15, allowing keys 11 to be pressed inwardly to engage against shoulders 10, due to pressure of arms 20 and springs 22. It will thus be seen that disk 7 may be shifted inwardly toward the center of disk 4 or even past the center thereof when it is desired to reverse rotation of shaft 3, by the mere operation of lever 24, without any preliminary interlocking operation. Also, that the operation of lever 24 in the reverse direction automatically effects a preliminary disengagement of keys 11 and a resulting outward travel of collar 13 without the necessity of any other mechanism.

It will be observed that annular collars 8 are set closely adjacent to each other, providing a series of intervening annular sockets for the keys, whereby very close adjustment of speed may be secured and a resulting large number of various speeds.

In Fig. 6 I have shown a construction in which the collars 8' of shaft 3' are square at each side without any bevel, thereby providing a positive lock against movement in either direction until the keys 11' are released. In such construction the shifting collar 16' is provided with double wedges 15', 15', operable in one direction or another by collar 23' in ways 17' of hub 13'. The keys are positively raised from engagement with shoulders 8' before shifting to the desired position, and are thrust into locking position by levers 20' and their retracting springs 22', as will be readily understood.

The invention may be utilized with different forms of disk drive mechanism for power transmission on automobiles or in any other use desired. It is extremely simple in construction and operation, not liable to get out of order, and is possessed of various features of advantage and usefulness which will be readily appreciated by all users of this class of mechanism.

Having described my invention, what I claim is:—

1. Variable drive mechanism consisting of a rotating disk, a shaft having a series of annular abutments, a shifting wheel thereon engaging the disk, and means for moving the wheel along the shaft and for making interlocking engagement with the annular abutments thereof.

2. Variable drive mechanism consisting of a rotating disk, a shaft having a series of annular abutments, a shifting wheel engaging the disk and having a hub in spline engagement with said shaft, a locking key, a wedge, and means operable to actuate the wedge and shift the hub and wheel.

3. Variable drive mechanism consisting of a rotating disk, a shaft having a series of annular abutments, a shifting wheel engaging the disk and having a hub in spline engagement with said shaft, a locking key, a wedge slidingly mounted in the hub, and a lever engaging the wedge and hub.

4. Variable drive mechanism consisting of a rotating disk, a shaft having a series of annular abutments, a shifting wheel engaging the disk and having a hub in spline engagement with said shaft, a locking key, a wedge, means operable to actuate the wedge and shift the hub and wheel, and means adapted to thrust the key into engagement with one of said annular abutments.

5. The combination of a driving disk, a shaft arranged transversely of the axial center thereof and having a series of longitudinally arranged abutments, a friction wheel engaging the face of the disk and having a hub in spline engagement and slidingly mounted on said shaft, a key arranged transversely of said hub adapted to engage one of said abutments, mechanism mounted on the hub for actuating said key, and an operating lever adapted to engage said mechanism and to shift the hub along the shaft.

6. The combination of a driving disk, a shaft arranged transversely of the axial center thereof provided with a series of annular abutments having beveled faces at one side, a friction wheel engaging the face of the disk and having a hub in spline engagement and slidingly mounted on said shaft, a key extending transversely through the hub adapted to engage one of said abutments, a wedge slidingly mounted on the hub adapted to retract the key, a spring controlled device adapted to press the key inwardly, and a lever operable to actuate the wedge.

7. The combination of a driving disk, a shaft arranged transversely of the axial center thereof provided with a series of annular abutments having beveled faces at one side, a friction wheel engaging the face of the disk and having a hub in spline engagement and slidingly mounted on said shaft, a key extending transversely through the hub adapted to engage one of said abutments, a wedge slidingly mounted on the hub adapted to retract the key and to engage the hub to shift it, a spring controlled device adapted to press the key inwardly, and a lever operable to actuate the wedge to operate the key and to shift it and the wheel hub respectively.

In testimony whereof I affix my signature in presence of two witnesses.

JOSEPH F. BARTOSIK.

Witnesses:
C. M. CLARKE,
CHAS. S. LEPLEY.